(12) United States Patent
Herring et al.

(10) Patent No.: US 11,473,323 B2
(45) Date of Patent: Oct. 18, 2022

(54) CONTAINER ASSEMBLY AND METHOD FOR MAKING SAME

(71) Applicants: Jason Herring, Georgetown, TX (US); Shane Gilbreath, Georgetown, TX (US)

(72) Inventors: Jason Herring, Georgetown, TX (US); Shane Gilbreath, Georgetown, TX (US)

(*) Notice: Subject to any disclaimer, the term of this patent is extended or adjusted under 35 U.S.C. 154(b) by 232 days.

(21) Appl. No.: 16/884,846

(22) Filed: May 27, 2020

(65) Prior Publication Data

US 2021/0372151 A1    Dec. 2, 2021

(51) Int. Cl.
*E04H 4/00*  (2006.01)
*F16B 17/00* (2006.01)
*E04H 4/14*  (2006.01)

(52) U.S. Cl.
CPC .......... *E04H 4/005* (2013.01); *E04H 4/0018* (2013.01); *E04H 4/142* (2013.01); *F16B 17/008* (2013.01); *E04H 2004/146* (2013.01)

(58) Field of Classification Search
CPC .................................................. E04H 4/0018
See application file for complete search history.

(56) References Cited

U.S. PATENT DOCUMENTS

| | | |
|---|---|---|
| 3,416,165 A | 12/1968 | Pereira |
| 3,501,782 A | 3/1970 | Schwartz et al. |
| 3,736,599 A | 6/1973 | Kessler et al. |
| 9,903,128 B2 | 2/2018 | Lisk |
| D822,226 S * | 7/2018 | Rathnam ............... E04H 4/0018 D25/2 |
| D870,918 S | 12/2019 | Rathnam |
| 2018/0148945 A1 | 5/2018 | Roux |
| 2021/0372151 A1* | 12/2021 | Herring ................ E04H 4/005 |

* cited by examiner

*Primary Examiner* — Andrew J Triggs
(74) *Attorney, Agent, or Firm* — Michael P. Eddy

(57) ABSTRACT

The invention is an assembly of prefabricated metal receptacles forming a swimming pool and a method for constructing the assembly. Among other features, the assembly is characterized by guided clamping structures that allow on-site construction without requiring on-site welding or access to the bottom or interior of the assembly.

13 Claims, 13 Drawing Sheets

CONTAINER ASSEMBLY AND METHOD FOR MAKING SAME

CROSS-REFERENCE TO RELATED APPLICATIONS

Not applicable

FEDERALLY SPONSORED RESEARCH

Not applicable

SEQUENCE LISTING OR PROGRAM

Not applicable

FIELD OF THE INVENTION

The present invention relates to prefabricated swimming pools. More specifically this invention relates to swimming pools constructed of two of more prefabricated shell structures removably clamped together.

BACKGROUND OF THE INVENTION

Swimming pools are a popular addition to residential and commercial housing projects. Both above ground and in-ground pools are popular. In addition, both modular pool assemblies, constructed from a number of interconnecting panels, and single-shell pool structures have been used in the prior art. Pools are constructed from metal, plastic, and fiberglass prefabricated components or custom engineered as on-site, concrete pools. Typically, pools are constructed with an outer structural form and lined with a watertight sealant or membrane. Despite decades of effort, most pools suffer from one or more of the following issues: high cost, complex construction, and poor design options. Embodiments of the present innovation address these issues in a novel way by exploiting features of intermodal metal shipping containers as prefabricated shell structures and providing an improved on-site assembly method.

The prior art discloses several examples of swimming pools and even modular housing structures constructed using intermodal shipping containers. However, typical shipping container pools have been limited to a single container or portions of a single container to provide a receptacle for water. This is due in part to previous construction techniques that require significant welding and do not provide a safe, on-site construction method for joining multiple containers.

At least one embodiment of the present innovation provides a useful, novel and non-obvious structure and method for joining multiple, modified containers providing multi-container pools and improved safety during construction.

SUMMARY

Although, the present disclosure relates to different aspects and embodiments, it is understood that the different aspects and embodiments disclosed can be integrated, combined, or used together as a combination system, or in part, as separate components, devices, and systems, as appropriate. Moreover, paragraph headings are intended as organizational aids but not as limitations or constraints to the breadth of the disclosed innovation.

In part, this disclosure relates to a swimming pool structure and methods for assembling the structure. The pool structure consists of at least two intermodal metal shipping containers joined with no welding and no need for access along the interface seam between the two containers. The joined containers form a water reservoir. Furthermore, assembly of the structure can be done on-site and in-ground using a process that is reversible.

Modification of a Metal Intermodal Shipping Container

In one aspect, an intermodal shipping container (an example of a hollow rectangular prism) is modified to form an open receptacle and is used to provide a transportable, durable, and cost effective prefabricated shell for constructing a swimming pool. For example, unmodified, a container has six side panels, including a top panel, a bottom panel, a back panel, a front panel, and two end panels, where one end panel is a door or pair of doors. Modified containers are receptacles where several panels are completely or partially removed. For example, a rectangular receptacle for a swimming pool assembly as used in the present invention can be formed with two end panels, a back panel, and a bottom panel. The edge resulting from removing panels is called a free edge. At least two containers are suitably modified as open receptacles and joined to form a swimming pool assembly. By removing other combinations of panels or portions of panels, other swimming pool configurations can be formed.

Container to Container Interface

In one aspect, an assembly interface is formed by attaching a separate frame to the free edge of each receptacle. Among other benefits, each frame strengthens the free edge of each receptacle. The frame of at least one receptacle includes some threaded couplers. In addition, guide structures are attached or otherwise positioned along the bottom panel of at least one receptacle. The intention is to have at least one receptacle with captive internally threaded couplers positioned and aligned opposing a second receptacle with guide structures. In this case, the guide structures provide a convenient method to position threaded rods (long bolts) or to guide suitable bolt tightening tools. Access to the positioned threaded rods does not require access to the bottom panel of either receptacle. Access to the threaded rods is provided from a position adjacent to the receptacle.

Container Assembly and Principles of Construction

In one aspect, the present innovation provides for the safe and convenient assembly of at least two containers. Each container is modified as a framed receptacle and can be transported using any roadway suitable for a conventional intermodal container truck and trailer. On-site, the assembly of large metal structures often includes large, powerful equipment used to lift and position the structures. By separating a larger swimming pool into two movable receptacles, the loads are smaller and the required equipment can be smaller.

During installation, two receptacles are positioned adjacent to one another and clamped together using threaded rods and the captive couplers. Turning the threaded rods into the couplers pulls the receptacles together. In one embodiment, a seal structure is placed between the receptacles prior to clamping. The clamping can be done on-site and even with the receptacles positioned and safely resting inside an excavated hole. Thus, the seam between the two receptacles is joined and watertight without onsite welding.

The summarized assembly provides at least the following benefits:

Reduced cost: Each receptacle can be transported separately eliminating more expensive transportation of large structures. In-ground installation can be done by lifting each receptacle separately and then clamping them together. This allows the use of smaller cranes and access to smaller installation sites.

Improved safety: Injury danger is reduced because no human technician needs access to the bottom of the receptacles on-site.

Design flexibility: Assembly using the guide structures provides a means to remove threaded rods (bolts) in the future and allows the structure to be disassembled, removed, and reassembled.

No welding: No welding is done to join multiple receptacles on site.

Other benefits and advantages of the disclosed innovation will be apparent from careful study of the drawings and subsequent description.

BRIEF DESCRIPTION OF THE FIGURES

The figures are to be considered illustrative in all aspects and are not intended to limit the disclosure. The figures are not necessarily to scale.

DETAILED DESCRIPTION

The invention provides a pool structure and a novel method of assembling the structure. At least two intermodal shipping containers are modified, reinforced with appropriate framing, and become receptacles. Among other benefits, the framing configures several structures for securing at least two receptacles together with a watertight interface between them.

Modification of a Metal Intermodal Shipping Container

Figure 1:
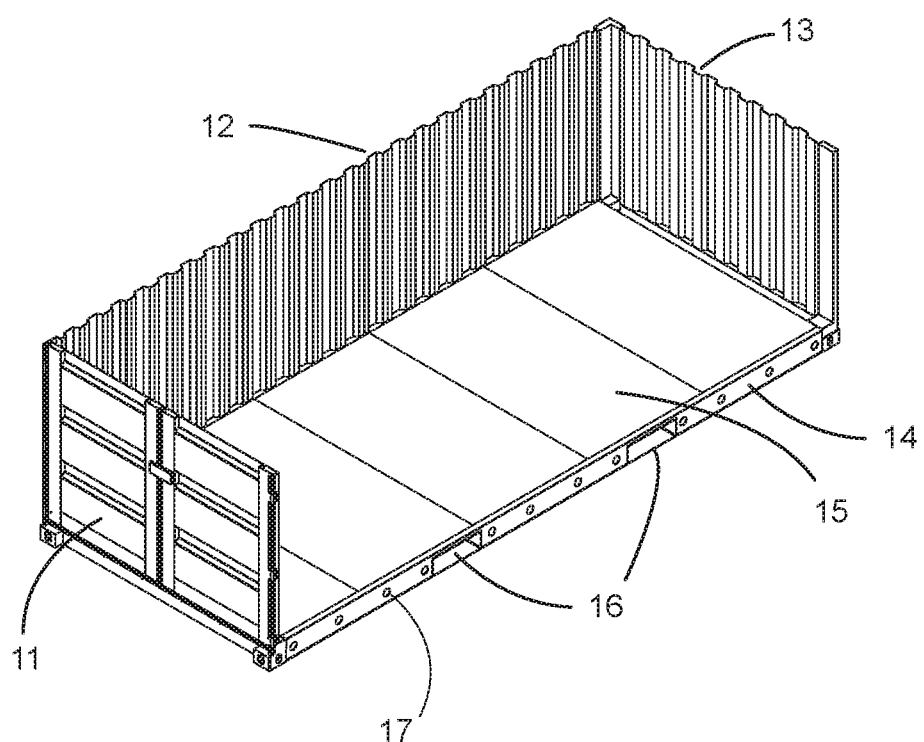
FIG. 1 is an isometric view of a modified shipping container.

In one embodiment, each intermodal shipping container is modified to produce an open receptacle 10 shown in FIG. 1.

A container begins as a rectangular, eight-corner, six-paneled, closed box (hollow rectangular prism) made of corrugated steel with double doors at one end (door end panel) opposite a small rectangular solid side (cap end panel) and completed with four long rectangular sides (bottom, top, front, and back panels). Portions of each container are removed, creating two matching receptacles. Each receptacle is an open box, comprising a door end panel 11, a cap end panel 13, two side panels (bottom panel 15, back panel 12), and a free edge. The free edge comprises a front edge 14, the front edges of the door end panel and the cap end panel, and the top edges of the door end panel, back panel, and cap end panel. Depending on the volume of the objective pool, the end panels and side panels may not be their original size. In FIG. 1, the front edge 14 has several guide holes 17 and fork-lift pockets 16. The guide holes are produced by machining or drilling techniques well known to the art.

Figure 2:
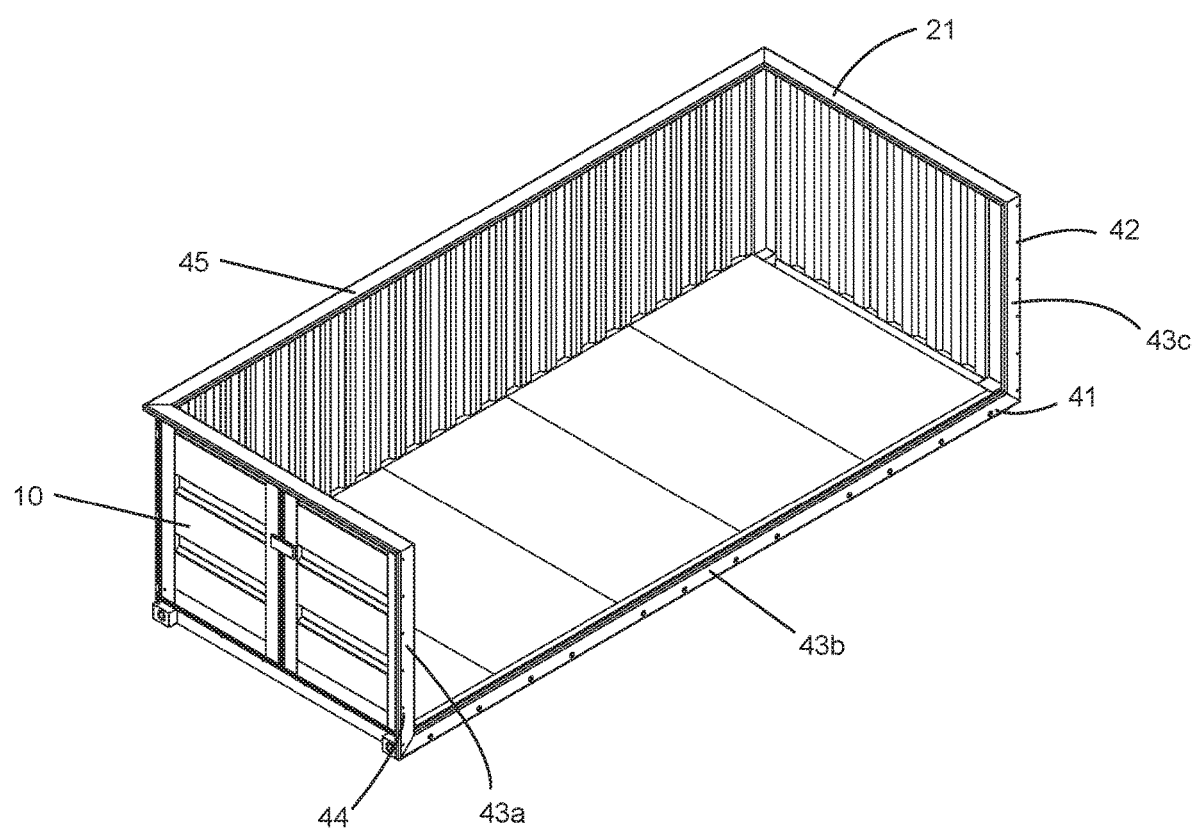
FIG. 2 is a view showing the reinforced free edge of a receptacle.

FIG. 2 shows further modification of a receptacle. A frame 21 is added to the free edge of a receptacle 10. The frame comprises at least a top interface portion 45 and a front interface portion 42 where the front interface portion is further comprised of two upright frame portions, 43a and 43c, and a bottom frame portion 43b. In one embodiment, bolt holes 44 are provided along the upright portions of the front interface portion. One or more of these bolt holes may be threaded to receive a bolt during assembly. Guide holes 41 are provided in the frame and align with guide holes 17 of FIG. 1.

Container to Container Interface

Figure 3A:
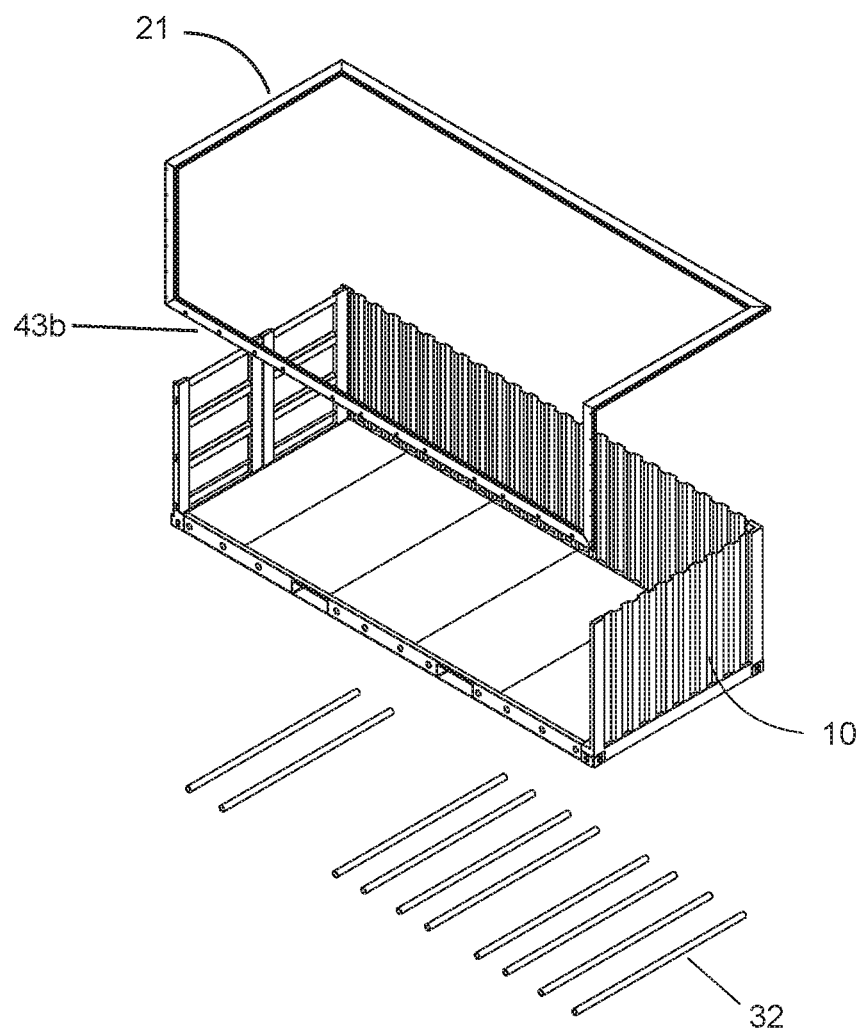
FIG. 3a is an exploded view of an embodiment of a modified and reinforced container showing guide tubes as guide structures.
Figure 4:
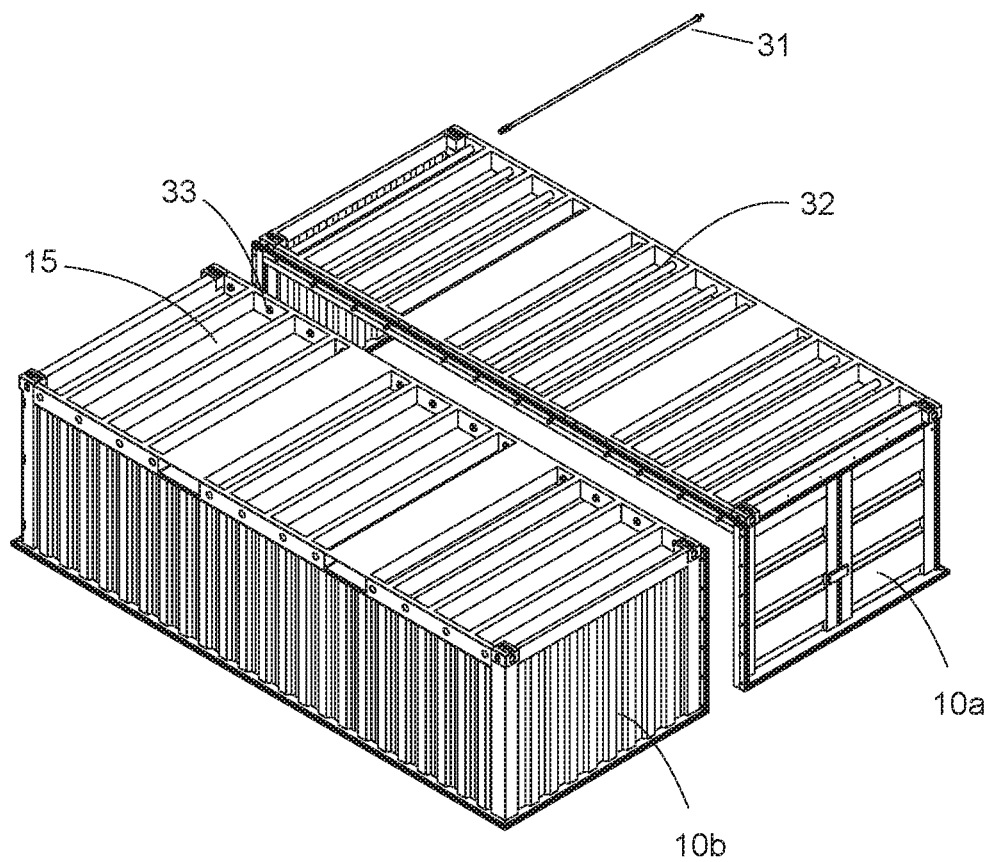
FIG. 4 is a bottom view of two receptacles showing relative locations of guide tubes, couplers, and a threaded rod prior to insertion in guide tube.

FIG. 3a shows an exploded view of a receptacle 10 and a frame 21. In one embodiment, the free edge of each open receptacle is reinforced with a metal rim feature welded to the edge. In one embodiment, this frame is constructed from vertical portions of 4 inch×2 inch rectangular tubing and horizontal portions of 6 inch×2 inch rectangular tubing. Along at least a part of the bottom interface portion 43b guide tubes 32 are positioned beneath the bottom panel and attached orthogonal to the edge and extended to the back panel as shown in FIG. 4. When assembled, the guide tubes provide a continuous open bore from the receptacle's back panel through the bottom frame interface portion 43b.

Figure 3B:
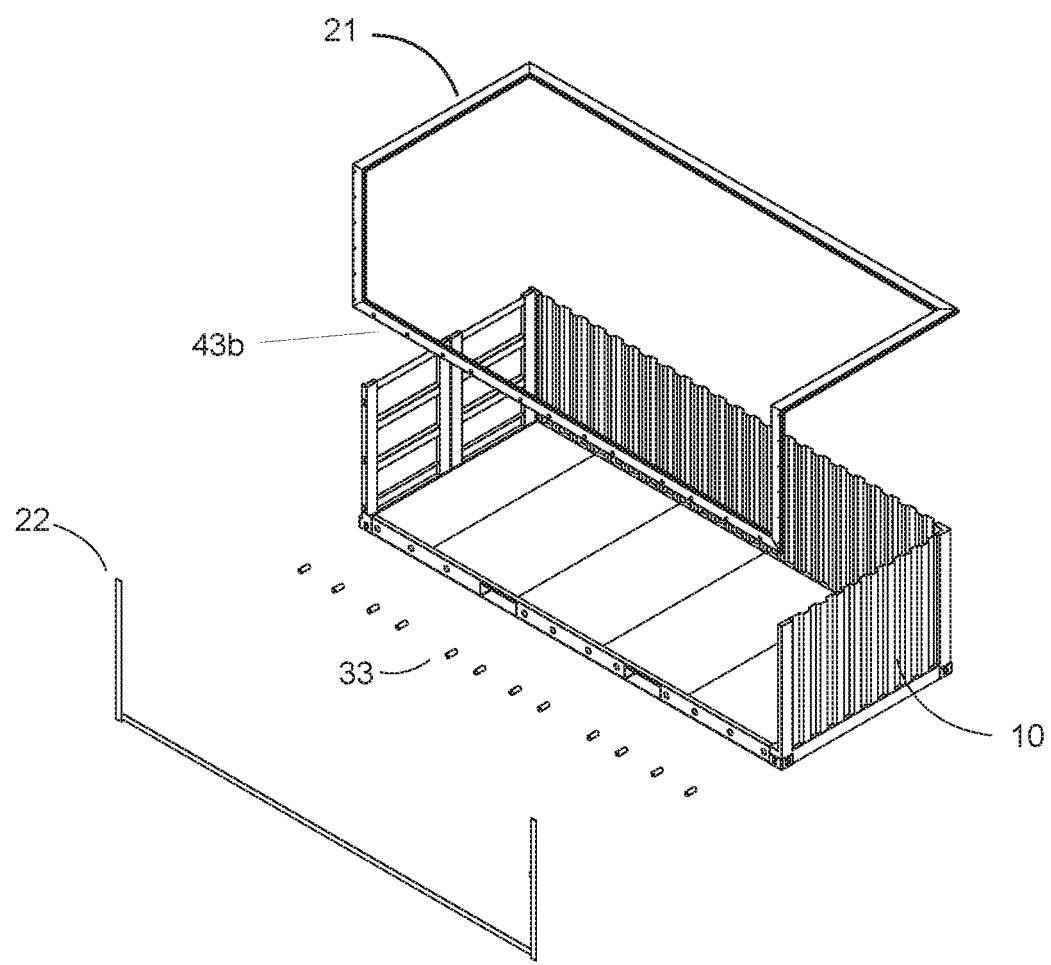
FIG. 3b is an exploded view of an embodiment of a modified and reinforced container showing threaded couplers.

Along at least one interface frame portion of at least one receptacle threaded coupling features are fitted. In one embodiment, these threaded coupler features are similar to a captive nut appropriately scaled for a swimming pool assembly. The exploded view of a receptacle FIG. 3b shows threaded couplers 33. These couplers are welded into positions and aligned with the guide holes and guide tubes as shown in FIG. 4. In another embodiment, the welded threaded couplers are replaced with formed or cut threads in the bottom frame interface portion.

An elastomer structure 22 is shown in FIG. 3b to be positioned along the interface portion of frame 21. The elastomer structure 22 helps produce a watertight seal along the interface between two receptacles. The elastomer structure is glued or otherwise adhered to a receptacle's interface portion prior to joining receptacles. Additional adhesive may be added to provide improved sealing with the mating receptacle.

FIG. 4 shows a bottom view of two receptacles prepared for assembly. In one embodiment, guide tubes 32 are positioned and fixed to one receptacle 10a and threaded couplers 33 are positioned and fixed on a mating receptacle 10b. A single threaded rod 31 is shown prior to insertion into a guide tube. In practice, a plurality of threaded rods are used. Each guided tube can receive and guide a threaded rod. In prior art assemblies and methods, access to the bottom of intermodal containers is required during assembly. However, it should be noted that threaded rod 31 can be inserted into the guide tubes without bottom access.

In one embodiment, the guide tubes are constructed of metal or other material with sufficient durability to continue to act as a guide tube when a receptacle is placed in an excavated hole and backfilled. In this case, the assembly can be removed and disassembled in the future. In one embodiment, fork-lift pockets are used as guide structures. Other structures that provide a guide channel for a threaded rod are within the scope of this disclosure.

In one embodiment, one receptacle is fitted with guide tubes and a mating receptacle is fitted with threaded couplers. However, in another embodiment, a single receptacle configuration can be used. In this case, receptacles are fitted with both threaded couplers and guide tubes in a pattern that allows two receptacles to be aligned and clamped. For example, threaded couplers (1) and guide tubes (2) can be arranged in an alternating pattern, 121212121212 on each receptacle. When receptacles are aligned, couplers will be opposite to guide tubes on the adjacent receptacle.

Figure 5:
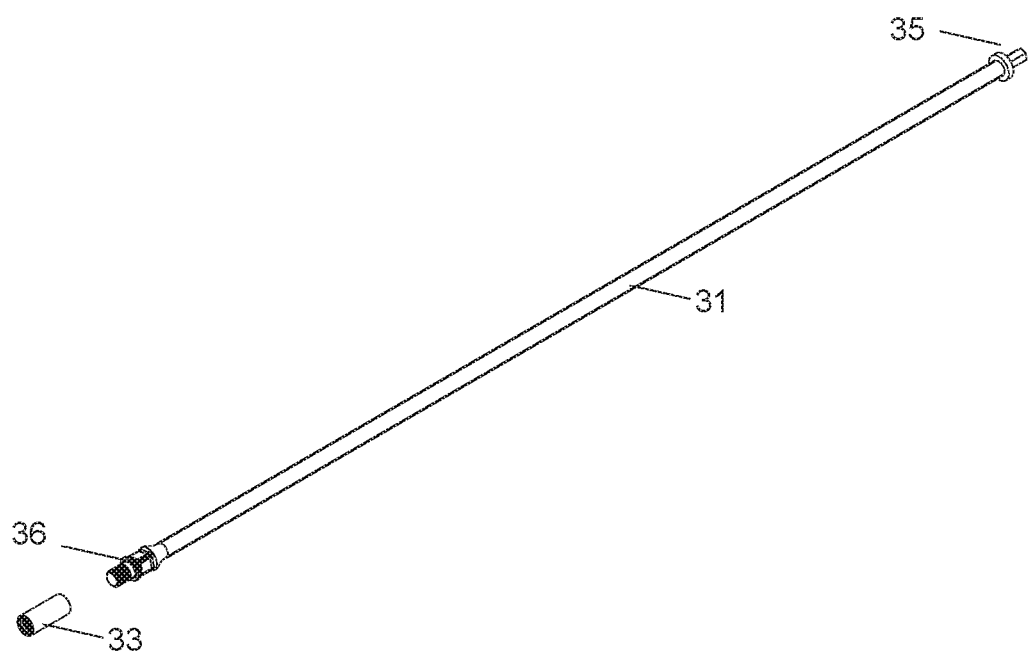
FIG. 5 is an isolated view of a threaded rod and a coupler.

An isolated view of a threaded rod 31 aligned with a threaded coupler 33 is shown in FIG. 5. The threaded rod 31 has a threaded end 36 and a drive end 35. The drive end is machined or otherwise formed into a shape suitable to receive a drive tool (not shown). For example, a hexagonal shape can receive a box wrench or socket. This is a shape well known to the art. Rotating the drive end 35 with a drive tool is intended to thread the threaded end 36 into the threaded coupler 33. In one embodiment, the length of the threaded rod 31 is sufficient to extend beyond the back panel of the receptacle and allow access to the drive end 35 while the threaded rod is inserted into a guide tube and the receptacle is resting on the ground. In one embodiment, a drive tool such as an extended length socket head could be used to drive a threaded rod whose drive end does not extend beyond the back panel.

Container Assembly and Principles of Construction

In one embodiment, two receptacles, one prepared with guide tubes and one prepared with threaded couplers, are positioned and assembled into a watertight swimming pool. Although several assembly steps are described here in a specific order, the assembly steps may be reordered according to the requirements of each project.

Figure 6:
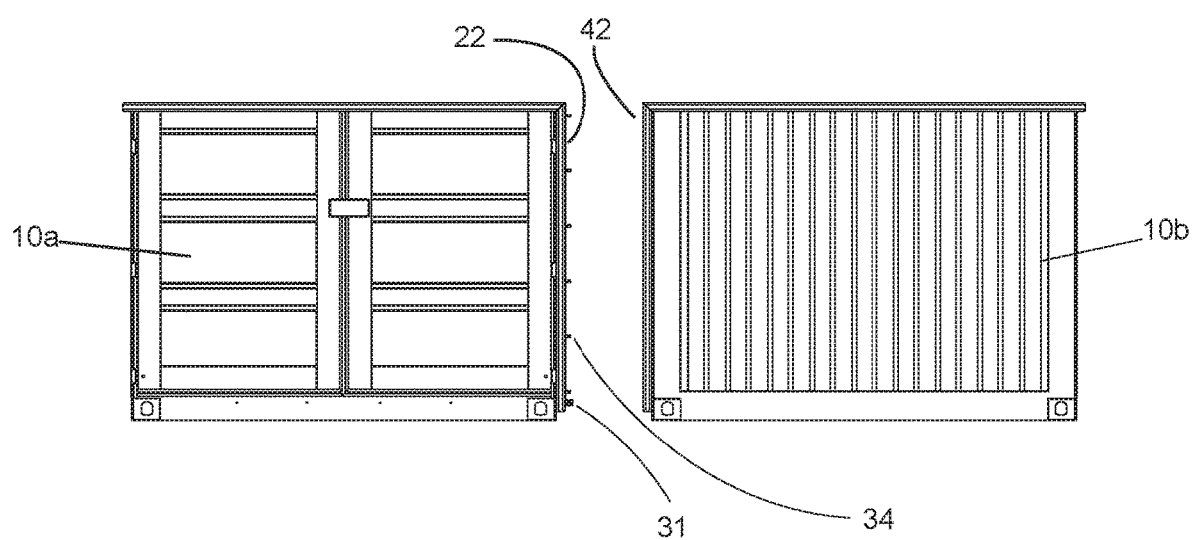
FIG. 6 is a view showing two receptacles suitably aligned for assembly.

1) Two intermodal containers, 10a and 10b, are prepared as in FIG. 6. At this point, both receptacles remain transportable on standard roadways and do not constitute an oversized load.

2) A thin elastomer sealing material 22 is adhered to or otherwise held in place along the interface edge of at least one receptacle.

3) Two receptacles are positioned such that their frame interface portions 42 are facing one another.

4) The receptacles are further positioned to align guide tubes of 10a with threaded couplers of 10b. Similarly, bolt holes, 44 in FIG. 1, are aligned. FIG. 6 shows two receptacles aligned but prior to reducing the gap between their respective interface portions.

5) The receptacles are positioned such that the gap between the interface portions is less than the length of thread on threaded end (36 in FIG. 5) of a threaded rod. This position is the 220 assembly position.

6) In the assembly position, a threaded rod is inserted into a guide tube of receptacle 10a. Rotating the threaded rod in a predetermined direction will drive the threaded end of the rod into the threaded coupler of the opposition receptacle 10b. Subsequent rotation of the threaded rod in the predetermined direction acts to pull the receptacles together.

7) In one embodiment a plurality of threaded rods are inserted and suitably rotated to pull the receptacles together. It is understood that the threaded rods may need to be inserted and rotated in a particular order to successfully draw the receptacles together without disturbing the receptacle alignment. For example, if the threaded rod 31 in FIG. 4 is inserted and rotated, it will preferentially close the interface gap along the opposing upright frame portions of receptacles 10a and 10b and misalign the remaining guide tubes and couplers.

8) A plurality of bolts 34, whose threaded ends are shown protruding in FIG. 6, are inserted in bolt holes 44 (not visible in FIG. 6, see FIG. 2). The bolts are secured by threading into the opposing threaded hole of receptacle 10b or inserting the bolts through the through hole or receptacle 10b and using suitable washers and nuts to secure them.

9) Bolts and threaded rods are tightened such that the interface frames of receptacles 10a and 10b clamp elastomer 22 substantially uniformly and with sufficient force to form a watertight seam.

Figure 7A:
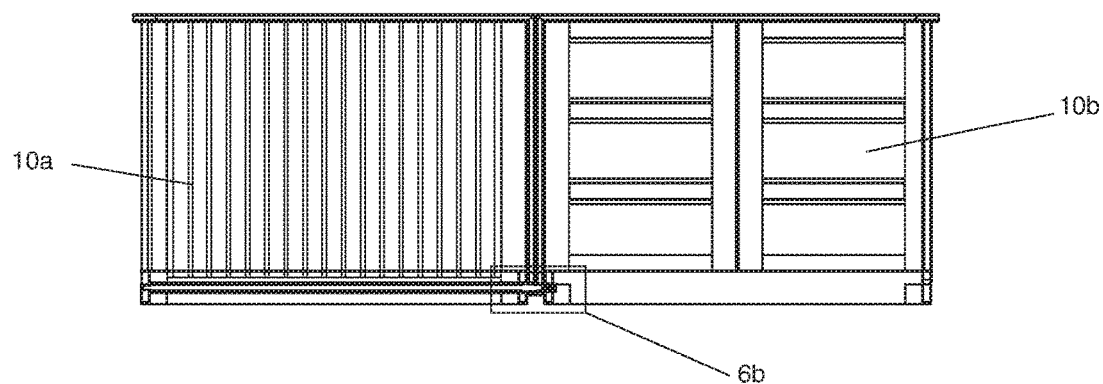
FIG. 7a is a cross-section view of an interface between two receptacles.
Figure 7B:
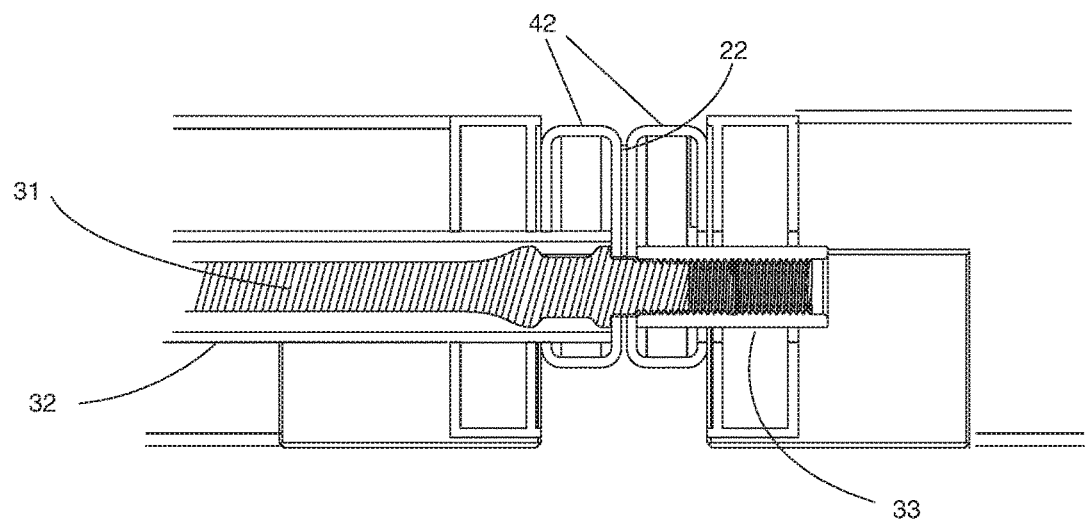
FIG. 7b is an enlarged view of an interface between two receptacles.
Figure 8:
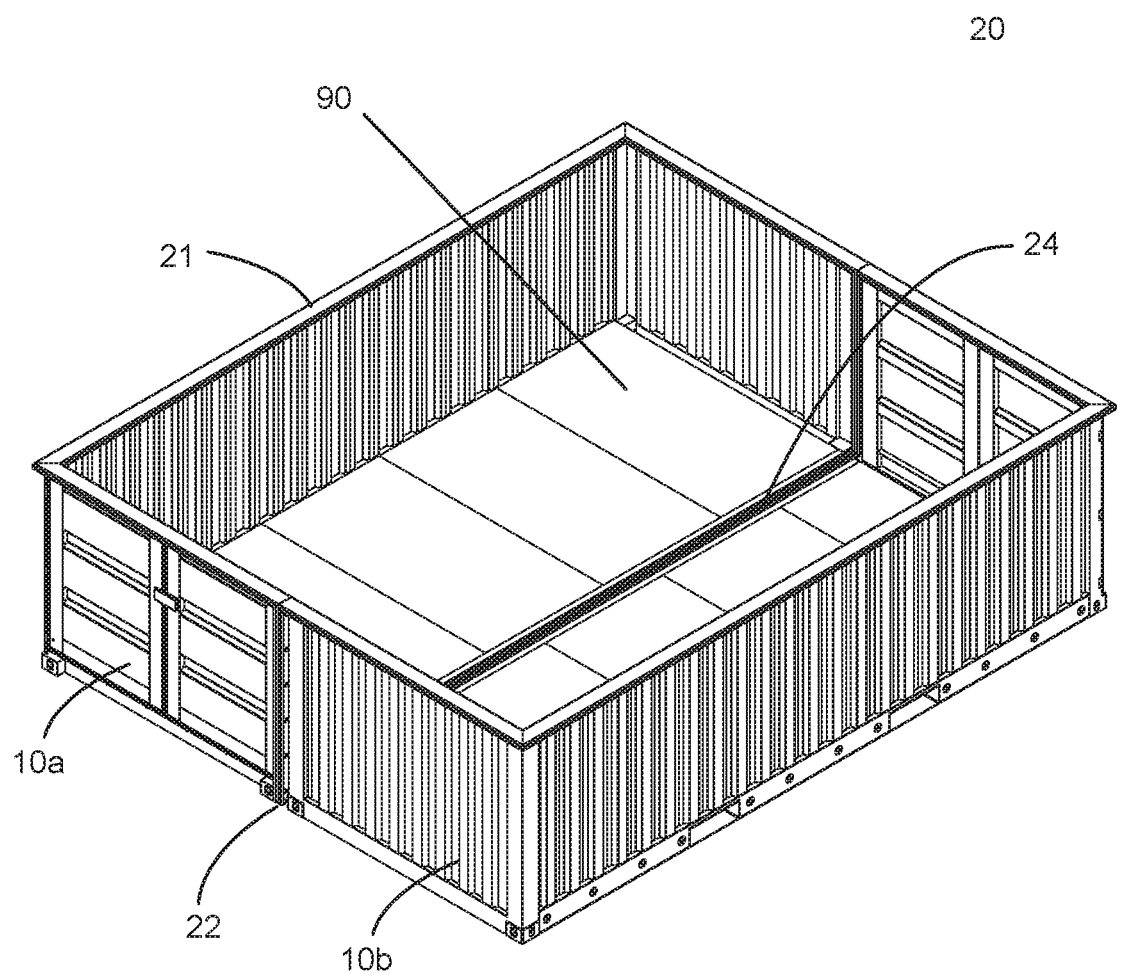
FIG. 8 is an isometric view of an embodiment of a swimming pool assembly.

10) FIGS. 7a and 7b show the cross-section of two receptacles assembled. FIG. 7b is an enlarged view showing a threaded rod 31 fully inserted into a guide tube 32 and threaded fully into a threaded coupler 33. FIG. 8 shows an isometric view of two receptacles assembled 20.

Again, it is important to note that the method of assembly is reversible such that the threaded rods can be removed and the receptacles repositioned. The disclosed assembly does not require welding along seam 24 or access to the interior space 90 during the assembly steps.

Figure 9A:
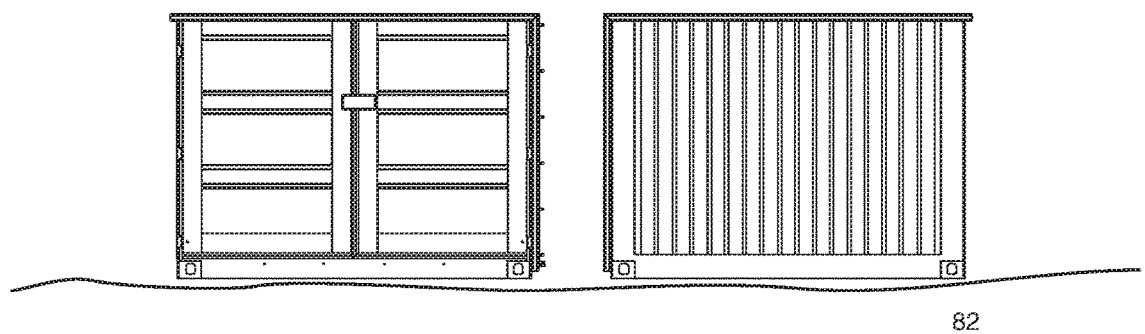
FIG. 9a is a sketch of receptacles positioned above ground.
Figure 9B:
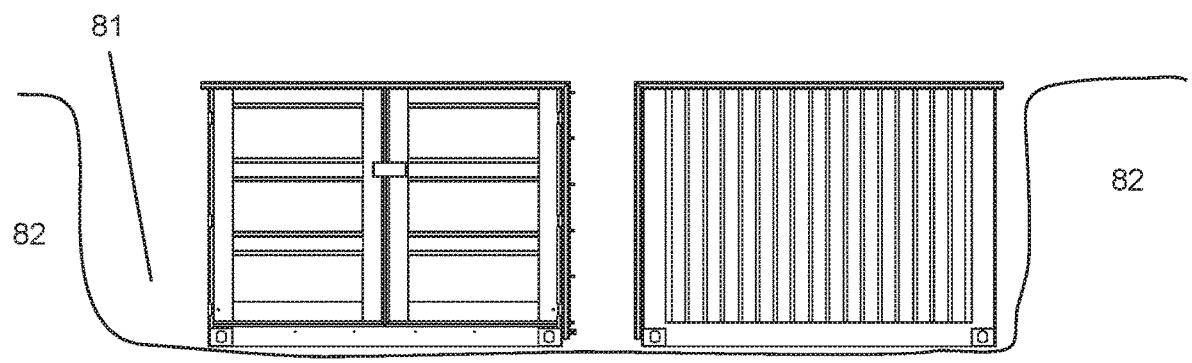
FIG. 9b is a sketch of receptacles positioned below ground with space allowing access for assembly.

The modification of intermodal shipping containers and the method of assembly disclosed are appropriate for swimming pools located above ground 82 as shown in FIG. 9a or below ground as in FIG. 9b. A gap or assembly space 81 is provided when placing the receptacles below ground. This gap is shown along one receptacle but may have other shapes or dimensions.

Some Alternative Configurations

Guide tubes can be tubes, guide rings, a slot, slots or a combination of these structures. The primary requirement is to guide the threaded rod to the couple and resist being deformed or filled with debris to an extent that causes the structure to no longer function as a guide for the threaded rod.

FIG. 4 shows the guide tubes located on the exterior surface of the receptacle's bottom panel. In one embodiment, the guide tubes can be fixed along the interior surface of the bottom panel. In this position, the tubes would be appropriately covered to provide a smooth interior pool surface.

Figure 10:
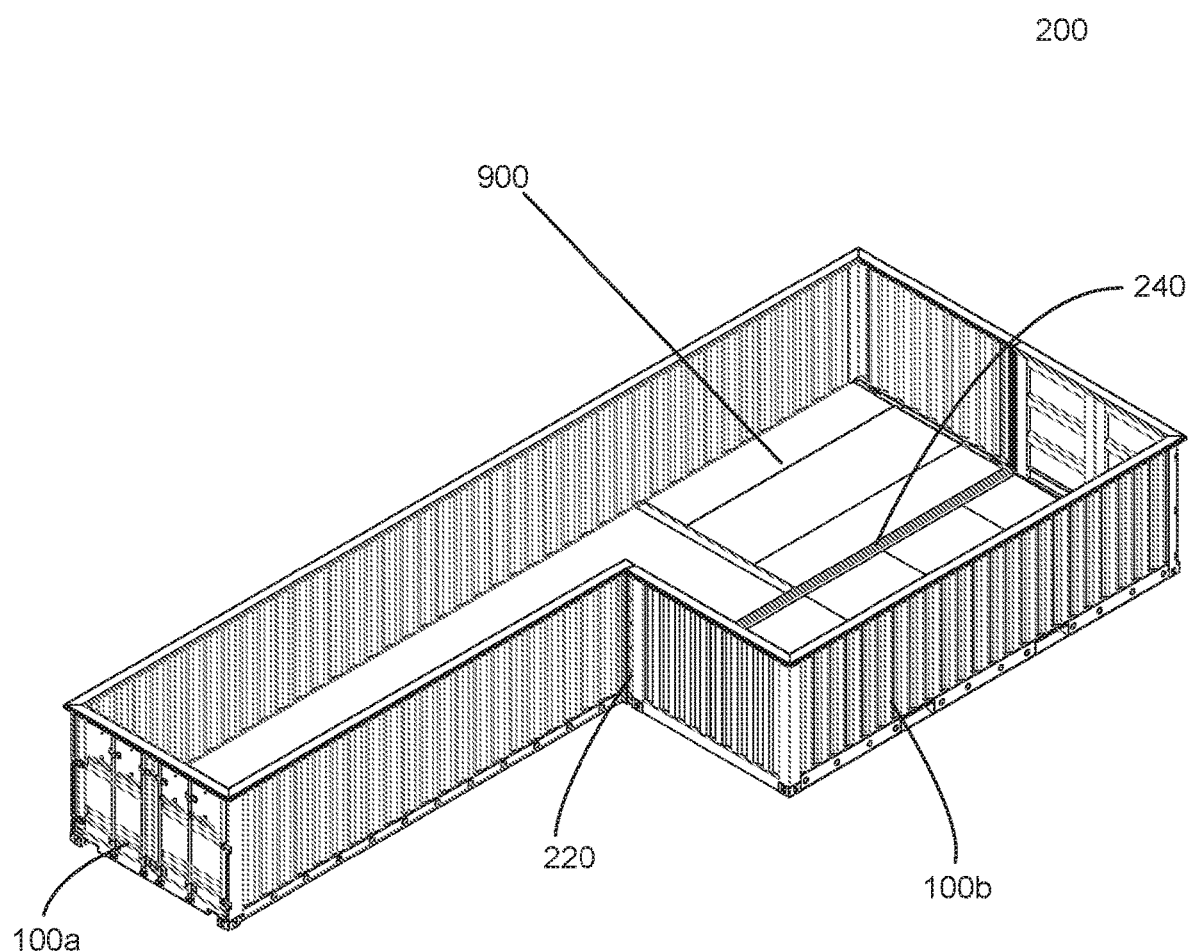
FIG. 10 is an isometric view of an alternative arrangement of two receptacles.
Figure 11:
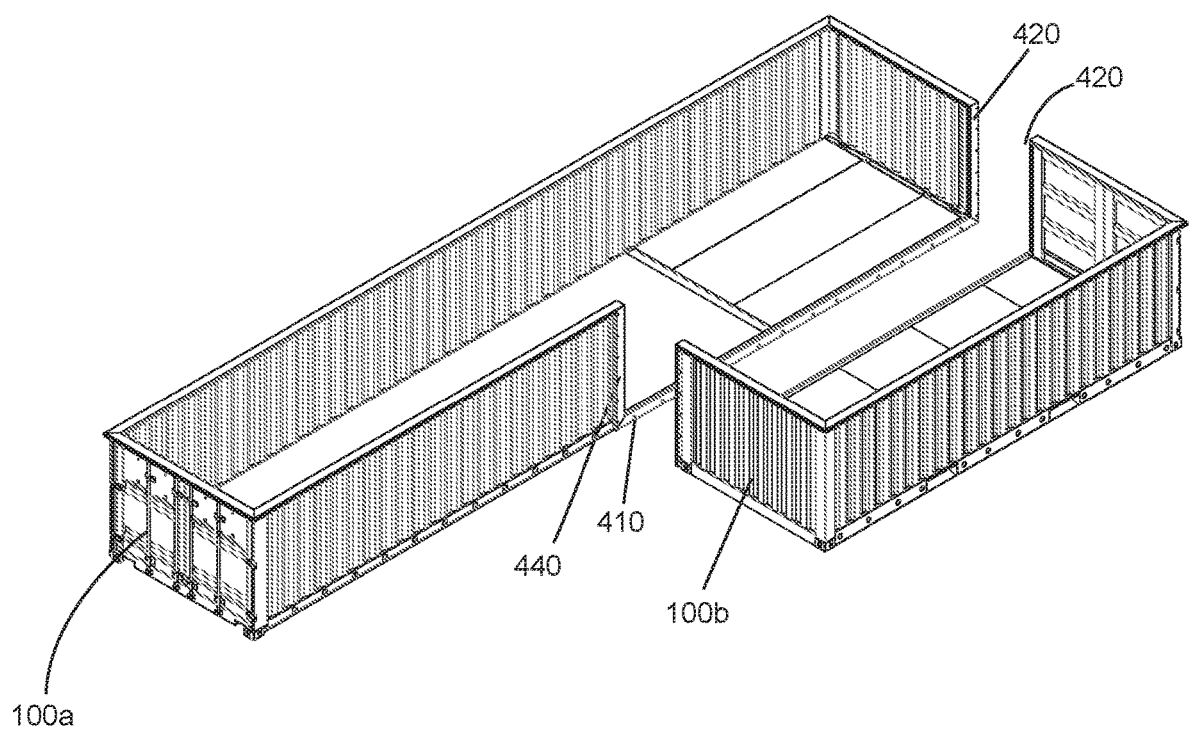
FIG. 11 is an isometric view of the appropriate alignment of two receptacles in an alternative arrangement.
Figure 12:
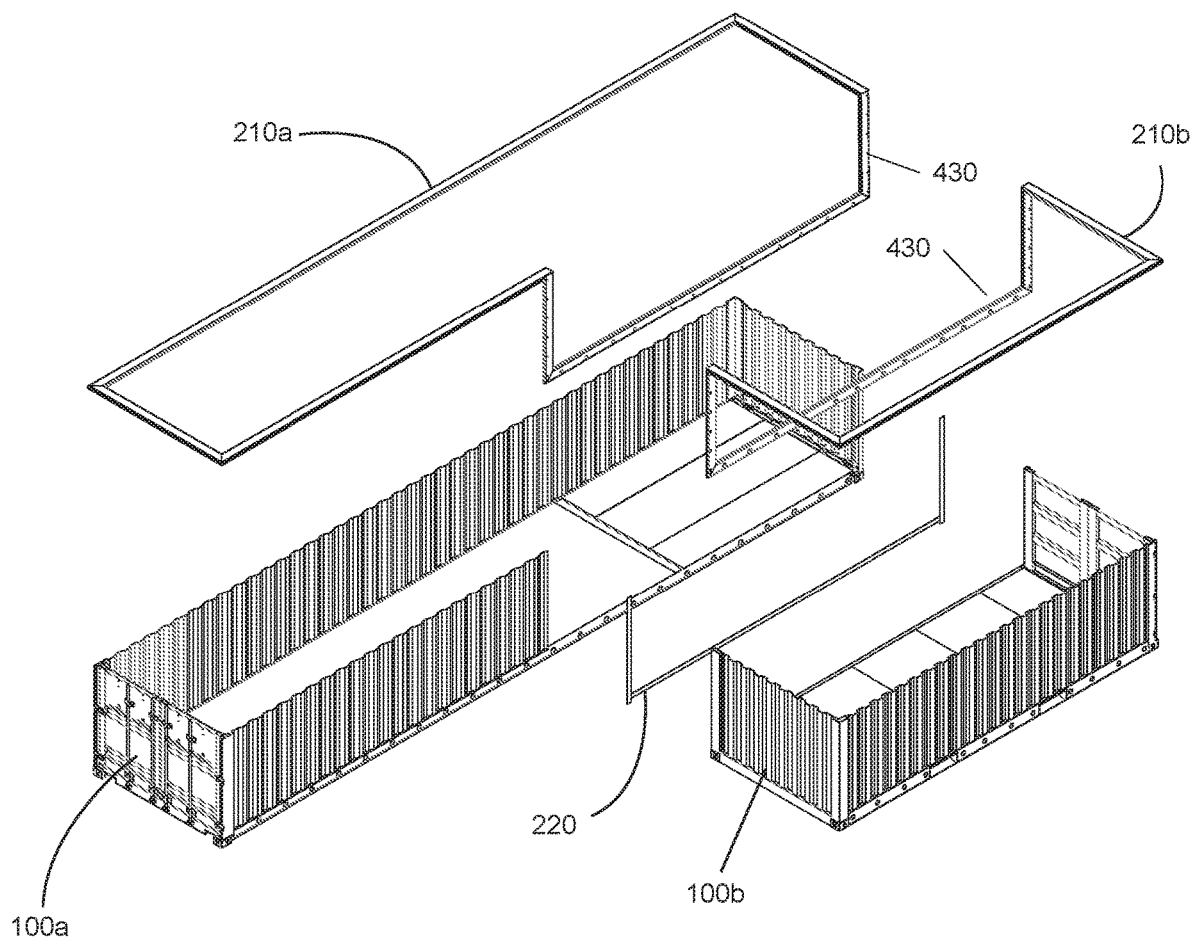
FIG. 12 is an exploded view of an alternative arrangement showing the appropriate interface frames and a sealing structure.

One embodiment of the assembled receptacles is a rectangle as in FIG. 8. Other shapes, such as the L shape 200 in FIG. 10 are within the scope of this disclosure. The assembly in FIG. 10 has a seam 240, with and appropriate clamped seal structure 220 analogous to seam and seal structures 24 and 22 respectively and provides an inner space 900 for containing water. The receptacles 100a and 100b in FIG. 10 are intermodal containers modified according to the exploded view in FIG. 12. FIG. 12 shows the frame interface portions 430 of each frame 210a and 210b. As with the rectangular assembly 20 of FIG. 8, the L shape assembly is constructed by aligning each receptacle 100a and 100b such that their frame interface portions are facing each other. An example of alignment is shown in FIG. 11. In this case, receptacles are positioned to align their respective guide holes 410 and bolt holes 440. Similar to rectangular assembly 20 of FIG. 8, several guide tubes (not shown) are attached to the bottom of receptacle 100*a* and aligned with guide holes 410. Additionally, threaded couplers (not shown) are attached to the interface frame of receptacle 100*b*. Thus, when receptacles 100*a* and 100*b* are aligned and positioned appropriately far apart, a threaded rod (not shown) can be inserted into a guide tube and rotated in the guide tube to thread into the threaded coupler of the opposite receptacle. Rotating the threaded coupler will pull the receptacles together and compress the interstitial seal to form a watertight container.

In one embodiment, two similarly modified receptacles are joined to form a watertight container as in FIG. 8. However, more than two modified receptacles can be prepared and joined to form a watertight container capable of container a larger water volume. For example, the modified container in FIG. 1 can be further modified by removing back panel 12. Three container panels remain. This modified, three-panel-container can be reinforced along the remaining free edges with a frame structure in a manner similar to the frame shown in FIG. 2 but with additional vertical and horizontal portions. The three-panel-container can be sandwiched between the two containers shown aligned in FIG. 6 with an additional seal structure. In this case, the three-panel-container can provide threaded couplers suitably aligned to accept threaded rod from both modified containers shown in FIG. 6. Several three-panel-containers can be joined on site prior to the addition of the modified containers shown in FIG. 6. In this way, an arbitrarily large container volume can be produced.

It should be understood that the present invention is not limited in its application to the details of construction and the arrangement of components set forth in the following description or illustrated in the drawings. The invention is capable of other embodiments and of being practiced or of being carried out in various ways. Also, it is to be understood that the terminology used herein is for the purpose of description and should not be regarded as limiting. The use of "includes", "including," "comprising," or "having" and variations is meant to encompass the items listed and their equivalents. Unless otherwise limited, the terms "attached", "connected," "coupled," "configured" and "mounted" and variations are used broadly and encompass direct and indirect connections, couplings and mountings. In addition, the terms "connected" and "coupled" and variations may include thermal, mechanical, and electrical connections. Furthermore, and as described in subsequent paragraphs, the specific mechanical configurations illustrated in the drawings are intended to exemplify embodiments of the invention. However, other alternative mechanical and/or electrical and other configurations are possible which are considered to be within the teachings of the disclosure. It will be understood that the dimensions suggested in the description of the figures are for illustration only and are not limited to those presented in this disclosure.

The examples and embodiments that are described are intended to illustrate potential and specific implementations of the container assembly and methods for constructing the assembly. These examples are intended primarily for purposes of illustration. To those skilled in the art, it is clear that there may be variations to these examples without departing from the spirit of the disclosure. The intent is to claim the broadest allowable description of the disclosed innovation.

What is claimed is:

1. An assembly for holding water comprising:
   a first hollow rectangular prism receptacle configured to have an open top, a bottom side panel, at least three side panels in addition to and connected to said bottom panel, and a free edge comprising edges of said at least three side panels and forming at least a top edge and a front edge;
   a first frame structure having a top frame interface portion rigidly attached to the top edge of said first receptacle and a front frame interface portion rigidly attached to the front edge of said first receptacle;
   a second hollow rectangular prism receptacle configured to have an open top, a bottom side panel, at least three side panels in addition to and connected to said bottom panel, and a free edge comprising edges of said at least three side panels and forming at least a top edge and a front edge;
   a second frame structure having a top frame interface portion rigidly attached to the top edge of said second receptacle and a front frame interface portion rigidly attached to the front edge of said second receptacle;
   at least one guide structure attached to said second receptacle positioned to guide at least one threaded rod parallel to said bottom panel and perpendicular to said front frame interface portion of said second receptacle;
   one of said at least one threaded rods inserted into said a respective guide structure;
   at least one threaded coupler rigidly attached to said first receptacle and positioned to receive said threaded rod from said second receptacle;
   a seal structure positioned between said front frame interface portion of said first receptacle and said front frame interface portion of said second receptacle;
   wherein said guide structure provides access to said threaded rod from a position adjacent to said second receptacle, when said first and second receptacles are suitably aligned, the threaded rod is rotated within said guide structure in a predetermined direction to thread into said aligned threaded coupler and to clamp the seal structure between the opposing front frame interface portions of said first and said second receptacles, when clamped, said first and said second receptacles and said seal form an open top assembly to hold said water.

2. The assembly of claim 1 further comprising a plurality of said guide structures attached to said second receptacle, a plurality of said threaded rods inserted into said guide structures, wherein said plurality of threaded rods can be suitably aligned with a respective one of said threaded couplers attached to said first receptacle.

3. The assembly of claim 1 wherein at least one of said guide structures and at least one of said threaded couplers are rigidly attached to said second receptacle and at least one of said guide structures and at least one of said threaded couplers are rigidly attached to said first receptacle.

4. The assembly of claim 1 wherein said first receptacle and said second receptacle are clamped such that the resulting open top assembly is substantially L-shaped.

5. The assembly of claim 1 wherein said first and second receptacles each comprise a intermodal shipping container made of corrugated steel.

6. The assembly of claim 1 wherein said seal structure is an elastomer gasket shaped to follow and conform to the front interface portions of said first and said second receptacles.

7. The assembly of claim 1 wherein said seal structure is a compliant coating applied to at least one of said front frame interface portions of said first and said second receptacles.

8. The assembly of claim 1 wherein said at least one guide structure is chosen from a list including: a channel, a pocket, or a tube.

9. The assembly of claim 1 wherein one end of said threaded rod is threaded and one end is a shaped to accept a tool for applying torsion, said shape is chosen from a list including: a circle, a square, a hexagon, a star.

10. A method for constructing an open top assembly for containing water comprising the steps of:
providing a first hollow rectangular prism receptacle configured to have an open top, a bottom side panel, at least three side panels in addition to and connected to said bottom panel, and a free edge comprising edges of said at least three side panels and forming at least a top edge and a front edge; further including a first frame structure having a top frame interface portion rigidly attached to the top edge of said first receptacle and a front frame interface portion rigidly attached to the front edge of said first receptacle;
providing a second hollow rectangular prism receptacle configured to have an open top, a bottom side panel, at least three side panels in addition to and connected to said bottom panel, and a free edge comprising edges of said at least three side panels and forming at least a top edge and a front edge; further including a second frame structure having a top frame interface portion rigidly attached to the top edge of said second receptacle and a front frame interface portion rigidly attached to the front edge of said second receptacle;
providing at least one guide structure attached to said second receptacle positioned to guide at least one threaded rod parallel to said bottom panel and perpendicular to said front frame interface portion of said second receptacle;
inserting one of said at least one threaded rods into a respective said guide structure;
providing at least one threaded coupler rigidly attached to said first receptacle;
positioning said first and second receptacles to suitably align said front frame interface of said first receptacle with said front frame interface of said second receptacle and thereby aligning said inserted threaded rod and said at least one threaded coupler;
providing a seal structure positioned between said front frame interface portion of aid first receptacle and said front frame interface portion of said second receptacle;
turning said inserted threaded rod such that the rod threads into said threaded coupler and thereby pulls said second receptacle and said first receptacle together wherein said pulling together clamps said seal structure producing a watertight seam between said first and second receptacle.

11. The method of claim 10 further including the steps of:
providing a plurality of said at least one guide structures attached to said second receptacle and positioned to guide a plurality of said at last one threaded rod parallel to said bottom panel and perpendicular to said front frame interface portion of said second receptacle;
inserting said plurality of threaded rods in said plurality of guide structures;
providing of said threaded couplers rigidly attached to said first receptacle;
positioning said first and second receptacles to suitably align said front frame interface of said first receptacle with said front frame interface of said second receptacle and thereby aligning each of said plurality of said inserted threaded rods with a corresponding said threaded coupler;
turning said plurality of inserted threaded rods such that each rod threads into said aligned threaded coupler and thereby pulls said second receptacle and said first receptacle together wherein said pulling together clamps said seal structure producing a watertight seam between said first and said second receptacle.

12. The method of claim 10 further comprising the step of:
providing an excavated hole for in-ground placement of said first receptacle and said second receptacle wherein said excavated hole provides suitable access for turning said at least one threaded rod after placement of said receptacles.

13. The method of claim 10 further comprising the steps of:
providing at least one more threaded coupler rigidly attached to said second receptacle;
providing at least one more guide structure attached to said first receptacle positioned to guide at least one more threaded rod parallel to said bottom panel and perpendicular to said front frame interface portion of said first receptacle;
inserting one of said threaded rods into either said guide structure of said second receptacle or into said guide structure of said first receptacle;
positioning said first and second receptacles to suitably align said front frame interface of said first receptacle with said front frame interface of said second receptacle and thereby aligning one of said threaded rods inserted in one of said guide structures of one of said receptacles and one of said at least one threaded couplers of the opposite aligned receptacle.

* * * * *